Aug. 17, 1937.   I. H. DUNHAM   2,089,934
GEAR HOUSING
Filed Dec. 28, 1936   2 Sheets-Sheet 1

Inventor
I. H. Dunham
By
Attorneys

Aug. 17, 1937.        I. H. DUNHAM        2,089,934
GEAR HOUSING
Filed Dec. 28, 1936        2 Sheets-Sheet 2
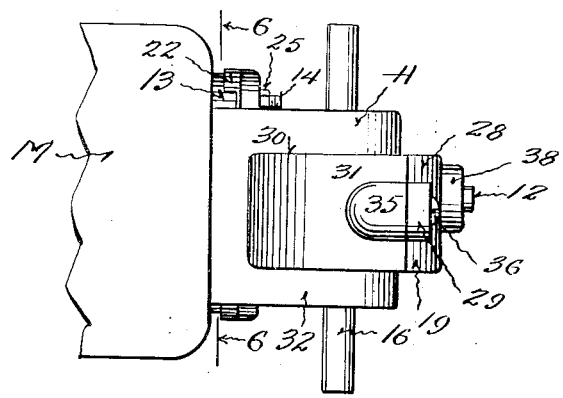
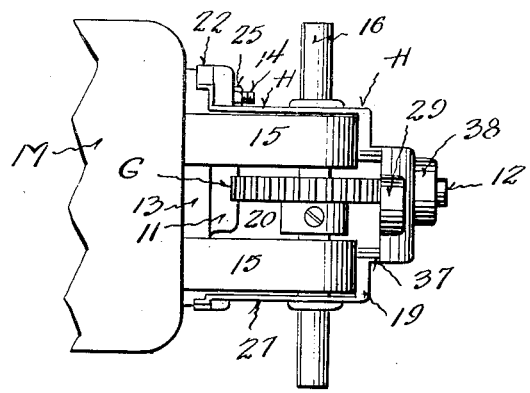
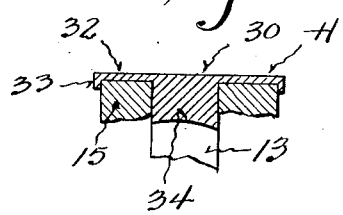
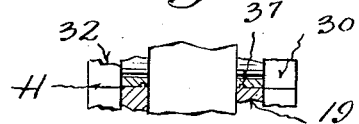
Inventor
I. H. Dunham Patented Aug. 17, 1937

2,089,934

UNITED STATES PATENT OFFICE 2,089,934

GEAR HOUSING

Irvie H. Dunham, Racine, Wis., assignor to Electric Motor Corporation, Racine, Wis., a corporation of Wisconsin Application December 28, 1936, Serial No. 117,915

5 Claims. (Cl. 74—606)

This invention appertains to electric motors, and more particularly to a housing for the reduction drive gearing of said motor.

One of the primary objects of my invention is to provide a novel housing for enclosing the reduction drive gearing of an electric motor, so as to thoroughly protect said gears against dust and dirt, and to permit the effective and constant lubrication of the gears and shaft bearings.

Another salient object of my invention is to provide novel means for forming said housing, whereby the same can be easily and quickly associated with the supporting ring for the gearing, and held in place by the same bolts utilized for securing the ring to the motor casing.

A further object of my invention is to provide means for centering the housing on the ring, and for forming a substantially grease-tight connection therewith, with means on the housing for forming a bearing for the extended end of the motor armature shaft.

A further important object of my invention is to provide a removable cover for the housing, so that entrance can be had to the gearing, and so that re-packing of the gearing with the lubricant can be easily accomplished, the cover engaging the body portion of the housing and bearing arms of the ring in a novel way.

A still further object of my invention is to provide a housing for the reduction drive gearing of an electric motor, which will be durable and efficient in use, one that will be simple and easy to manufacture, and one which can be placed upon the market and associated with the motor at a low cost.

With these and other objects in view, the invention consists in the novel construction, arrangement, and formation of parts, as will be hereinafter more specifically described, claimed, and illustrated in the accompanying drawings, in which drawings:

Figure 4 is a top plan view of the housing, showing the same applied to the motor.

Figure 5 is a view similar to Figure 4, showing the cover plate of the housing removed.

Figure 6 is a fragmentary, transverse, sectional view taken substantially on the line 6—6 of Figure 4, showing the manner of associating the cover plate with the bearing arms of the supporting ring.

Figure 7 is a fragmentary, transverse section taken substantially on the line 7—7 of Figure 1, looking in the direction of the arrows, illustrating the novel engagement of the cover plate with the body portion of the housing.

Figure 1:
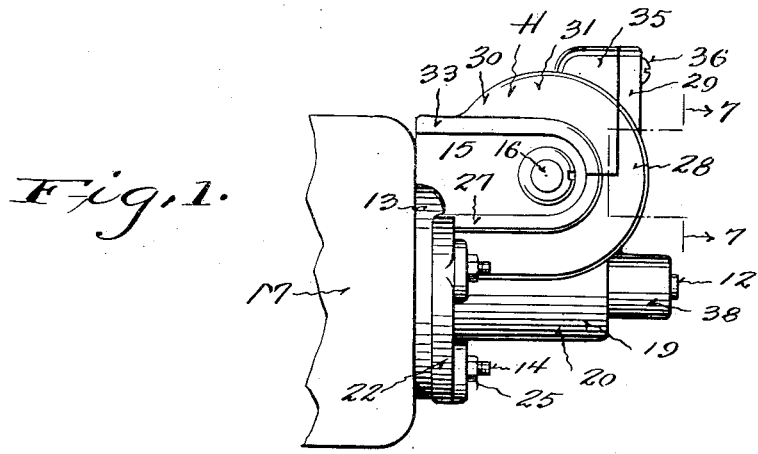
Figure 1 is a fragmentary side elevation of an electric motor, showing my novel housing incorporated therewith.
Figure 2:
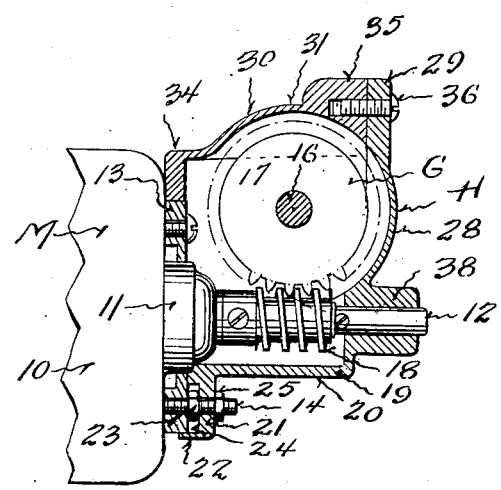
Figure 2 is a central section through the housing, showing the same applied to the motor.
Figure 3:
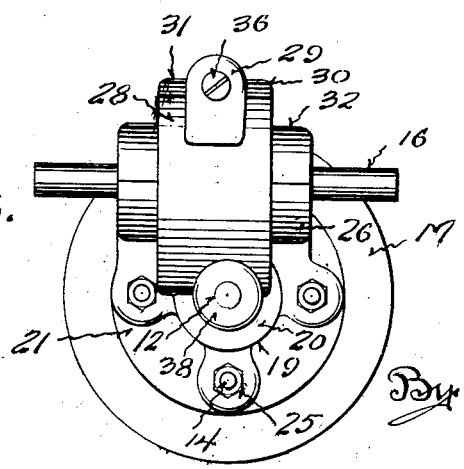
Figure 3 is a front elevation of the housing, showing the same on the motor.

Referring to the drawings in detail, wherein similar reference characters designate corresponding parts throughout the several views, the letter H generally indicates the novel housing for the drive gearing G and an electric motor M. The motor M can be considered of any preferred type, and the same includes a casing 10 having struck-out from its front wall the axial boss 11, which carries the bearing for the armature shaft 12. Surrounding the boss 11 is a supporting ring 13, held in place by bolts 14. Formed on the ring 13 are a pair of outwardly extending parallel arms 15, carrying bearings for the drive shaft 16, which forms a part of the reduction gearing G. The reduction gearing G includes a worm wheel 17, keyed or otherwise secured to the driven shaft 16, and this wheel meshes with a worm 18 rigidly secured to the armature shaft 12 for rotation therewith. The shaft 16 is utilized for driving the work.

The housing H forms the essence of my present invention, and includes a body portion 19 preferably formed from a single casting. This body portion is shaped to conform to the outline of the worm, and consequently the body portion includes a substantially semi-cylindrical part 20, having formed on its rear edge the radially extending wall 21, which is adapted to fit flat against the outer face of the supporting ring 13. This wall extends up to the arms 15, and the wall has formed thereon a rearwardly extending flange 22, which engages the outer face of the ring. The flange permits the accurate centering and placing of the body portion of the housing in position, and also forms in conjunction with the wall 21 a substantially grease-tight connection with the ring. The bolts 14 for the ring 13 have threaded thereon nuts 23 for holding the ring in place, and the inner face of the wall 21 has formed therein pockets 24 for receiving the nuts. The portions of the bolts 14 beyond the nuts are extended through the wall, and additional nuts 25 are then threaded on the bolts into intimate contact with the wall for holding the body portion of the housing in place.

The upper portion of the cylindrical part 19 of the housing has formed thereon laterally extending walls 26, which conform to the configuration of the arms 15 for contact therewith. These walls have formed thereon flanges 27, which engage the sides of the arms. The upstanding front wall 28 is also formed on the cylindrical part 19, and is of an arcuate shape to conform to the outline of the worm wheel 17. An upstanding ear 29 is formed on this front wall.

A removable cover plate 30 forms a part of the housing, and this cover plate includes an arcuate main portion 31, to conform to the outline of the worm wheel, and the laterally extending side walls 32, which extend over the arms 15. The walls 32 carry depending flanges 33 for engaging the outer sides of the arms.

The rear end of the cover plate has formed thereon a depending lip 34, which fits between the arms and rests upon the top surface of the ring 13. This lip 34 prevents shifting of the cover, and forms an adequate support for the inner end thereof. The front part of the cover has formed thereon a lug 35, into which is threaded the retaining screw 36. This screw 36 is threaded through the ear 29, and into the said lug.

In order to prevent leakage of the lubricant between the cover and the body portion of the housing, the meeting edges of the cover and body portion are provided with a tongue and groove connection 37. The front wall of the cylindrical portion of the body of the housing carries a bearing 38 for the forward end of the armature shaft, and consequently the housing itself functions to hold the armature shaft against wabbling.

From the foregoing description, it can be seen that I have provided an exceptionally simple and durable form of housing, which can be easily and quickly associated with the supporting ring of a drive reduction gearing of an electric motor for protecting said gearing, and for permitting the constant lubrication thereof.

Changes in details may be made without departing from the spirit or the scope of my invention, but what I claim as new is:

1. The combination with an electric motor having a boss and an armature shaft extended through the boss, a supporting ring fitted on the boss against the motor, a pair of supporting arms on the ring, a driven shaft rotatably carried by the arms, gearing between the driven shaft and the armature shaft, and bolts connecting the ring to the motor; of a housing for the gearing including a body portion shaped to conform to the configuration of the gearing, an outwardly extending rear wall on the body fitted against the ring receiving the bolts, a bearing on the body for the armature shaft, and a removable cover plate fitted against said arms and detachably secured to the body.

2. The combination with an electric motor, an armature shaft, a supporting ring fitted against the motor around the shaft, a pair of arms formed on the ring, a drive shaft carried by the arms, gearing between the drive shaft and the armature shaft, bolts connecting the ring with the motor; of a housing for the gearing including a body portion shaped to conform to the gearing and having lateral walls fitted against the lower surface of the arms, an outwardly extending rear wall on the body fitted against the ring, and a removable cover plate shaped to conform to the gearing having outwardly extending walls fitted against the upper surface of the arms, and means detachably connecting the cover plate with the body.

3. The combination with an electric motor, an armature shaft, a supporting ring fitted against the motor around the shaft, a pair of arms formed on the ring, a drive shaft carried by the arms, gearing between the drive shaft and the armature shaft, bolts connecting the ring with the motor; of a housing for the gearing including a body portion shaped to conform to the gearing and having lateral walls fitted against the lower portion of the arms, an outwardly extending rear wall on the body fitted against the ring, a removable cover plate shaped to conform to the gearing having outwardly extending walls fitted against the upper surface of the arms, means detachably connecting the cover plate with the body, and flanges on the last mentioned walls of the body and cover plate engaging the outer faces of the arms.

4. The combination with an electric motor including an armature shaft, a supporting ring surrounding the armature shaft and fitted against the motor, a pair of arms formed on the ring, a drive shaft carried by the arms, gearing upon the armature shaft and the drive shaft, and bolts connecting the ring with the motor; of a housing for the gearing including a body portion shaped to conform to the gearing having laterally extending walls fitted against the lower surface of the arms, an outwardly extending rear wall formed on the body fitted against the outer face of the ring receiving the bolts, and a rearwardly extending flange formed on the rear wall engaging the outer surface of the ring, and a bearing on the body portion receiving the outer end of the armature shaft.

5. The combination with an electric motor including an armature shaft, a supporting ring surrounding the armature shaft and fitted against the motor, a pair of arms formed on the ring, a drive shaft carried by the arms, gearing between the armature shaft and the drive shaft, and bolts connecting the ring with the motor; of a housing for the gearing including a body portion shaped to conform to the gearing having laterally extending walls fitted against the lower surface of the arms, an outwardly extending rear wall formed on the body fitted against the outer face of the ring receiving the bolts, a rearwardly extending flange formed on the rear wall engaging the outer surface of the ring, a bearing on the body portion receiving the outer end of the armature shaft, a removable cover plate for the body shaped to conform to the gearing having laterally extending walls engaging the upper surface of the arms, means detachably connecting the forward end of the cover plate to the body, and a depending lip on the cover plate disposed between the arms and engaging the upper surface of the ring.

IRVIE H. DUNHAM.